US009574035B1

(12) United States Patent
Tang et al.

(10) Patent No.: US 9,574,035 B1
(45) Date of Patent: *Feb. 21, 2017

(54) PROCESS FOR MAKING HIGH MOLECULAR WEIGHT TETRAPOLYMER AND ARTICLES PRODUCED THEREFROM

(71) Applicant: LION COPOLYMER GEISMAR, LLC, Geismar, LA (US)

(72) Inventors: Solomon H. K. Tang, Geismar, LA (US); Willie Charles Burton, Geismar, LA (US); Garrett Doucet, Geismar, LA (US)

(73) Assignee: LION COPOLYMER GEISMAR, LLC, Geismar, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,361

(22) Filed: Aug. 25, 2016

Related U.S. Application Data

(63) Continuation-in-part of application No. 15/247,049, filed on Aug. 25, 2016, which is a continuation-in-part of application No. 15/235,971, filed on Aug. 12, 2016.

(51) Int. Cl.
*C08F 210/18* (2006.01)
*C08K 5/00* (2006.01)
*C08K 3/00* (2006.01)

(52) U.S. Cl.
CPC .......... *C08F 210/18* (2013.01); *C08K 3/0041* (2013.01); *C08K 5/005* (2013.01)

(58) Field of Classification Search
CPC ......... C08F 210/18; C08F 236/20; C08F 2/06; C08F 2/14; C08F 2/34; C08F 2/38; C08F 210/06; C08K 5/005; C08K 3/0041; C08L 23/16; C08L 23/14
USPC ....... 524/554, 557; 526/88, 143, 169.2, 282, 526/905
See application file for complete search history.

(56) References Cited

U.S. PATENT DOCUMENTS

| | | | |
|---|---|---|---|
| 3,838,137 A | 9/1974 | Tang | |
| 3,856,765 A | 12/1974 | Collette et al. | |
| 3,884,993 A * | 5/1975 | Gros | C08J 3/005 525/192 |
| 3,903,062 A | 9/1975 | Arrighetti et al. | |
| 4,156,767 A | 5/1979 | Hall | |
| 5,242,971 A * | 9/1993 | Nakahama | C08L 21/00 524/482 |
| 5,473,017 A | 12/1995 | Wang | |
| 5,621,044 A | 4/1997 | Wang | |
| 5,786,504 A | 7/1998 | Nudenberg et al. | |
| 6,300,451 B1 | 10/2001 | Mehta et al. | |
| 6,384,162 B1 | 5/2002 | Zahalka et al. | |
| 6,686,419 B2 * | 2/2004 | Wouters | C08F 210/18 524/554 |
| 8,901,236 B2 * | 12/2014 | Burton | C08F 236/20 524/554 |
| 8,901,238 B2 * | 12/2014 | Tang | C08F 210/06 524/557 |
| 9,139,726 B2 | 9/2015 | Tang et al. | |
| 2004/0122190 A1 | 6/2004 | Cady et al. | |
| 2014/0100325 A1 | 4/2014 | Burton et al. | |

FOREIGN PATENT DOCUMENTS

CA     980497 A1    12/1975

OTHER PUBLICATIONS

Skinner et al, Cis-trans isomerism in Ziegler-catalysed terpolymerization of hexa-1,4-diene with ethylene and propylene, Polymer, vol. 13, Issue 5, May 1972, pp. 242-244.

* cited by examiner

*Primary Examiner* — Michael M Bernshteyn
(74) *Attorney, Agent, or Firm* — Buskop Law Group, PC; Wendy Buskop

(57) ABSTRACT

A process and articles for continuously making a tetrapolymer using two reactors connected in series with two saturated hydrocarbon streams, two injections of ethylene monomer, two injections of propylene monomer, and two injections of two different non-conjugated diene monomers simultaneously with two metallocene catalysts and two metallocene co-catalysts. This process allows for the creation of products with high molecular weights while utilizing continuous flow reactors in series, preventing an additional blending step. The process allows for manufacture of anti-vibration articles made by the tetrapolymers.

10 Claims, 1 Drawing Sheet

| Example | Ethylene | Propylene | VNB | ENB | Mw | MWD | Tan delta | Dynamic Complex Viscosity |
|---|---|---|---|---|---|---|---|---|
| | Wt% | Wt% | Wt% | Wt% | Daltons | | | |
| 4 | 73.5 | 26.5 | 0.2 | 3.5 | 697999 | 2.81 | 0.766 | 663200 |
| 5 | 73.6 | 26.4 | 0.2 | 3.9 | 888572 | 2.13 | 0.696 | 690380 |
| 6 | 77.7 | 22.3 | 0.2 | 5.7 | 875832 | 3.15 | 0.470 | 750310 |
| 7 | 75.7 | 24.3 | 0.2 | 5.4 | 822936 | 2.98 | 0.479 | 739195 |
| 8 | 74.4 | 25.6 | 0.2 | 5.35 | 848188 | 2.94 | 0.486 | 728080 |
| 9 | 74.7 | 25.3 | 0.2 | 5.5 | 804703 | 2.85 | 0.521 | 702230 |
| 10 | 73 | 27 | 0.2 | 5.55 | 802337 | 2.89 | 0.516 | 707788 |

PROCESS FOR MAKING HIGH MOLECULAR WEIGHT TETRAPOLYMER AND ARTICLES PRODUCED THEREFROM

CROSS REFERENCE TO RELATED APPLICATIONS

The present application is a Continuation in Part of co-pending U.S. patent application Ser. No. 15/247,049 filed on Aug. 25, 2016, entitled "PROCESS FOR MAKING HIGH MOLECULAR WEIGHT TETRAPOLYMER AND ARTICLES PRODUCED THEREFROM", which is a Continuation in Part of co-pending U.S. patent application Ser. No. 15/235,971 filed on Aug. 12, 2016, entitled "PROCESS FOR MAKING DAMPING HIGH STRENGTH ETHYLENE PROPYLENE DIENE POLYMER". These references are hereby incorporated in their entirety.

FIELD

The present embodiments generally relate to a process for continuously forming a tetrapolymer for use in anti-vibration applications using two reactors in series and one or two metallocene catalyst systems.

BACKGROUND

A need exists for a continuous, limited fouling process to create a tetrapolymer with high strength polymer, high density impact absorbance, and high heat resistance using two reactors in series.

A need exists for a process to create a low damping high strength polymer with a significant degree of long chain branching, a high degree of diene content, a branched molecular structure, and favorable elasticity characteristics.

The present embodiments meet these needs.

BRIEF DESCRIPTION OF THE DRAWINGS

The detailed description will be better understood in conjunction with the accompanying drawing as follows:

FIG. 1 depicts examples of tetrapolymers that can be prepared by the processes according to one or more embodiments.

The present embodiments are detailed below with reference to the listed FIGURE.

DETAILED DESCRIPTION OF THE EMBODIMENTS

Before explaining the present process in detail, it is to be understood that the process is not limited to the particular embodiments and that it can be practiced or carried out in various ways.

The embodiments generally relates to a continuous process for making an ethylene propylene diene polymer utilizing ethylene, propylene, and diene monomers in two reactors connected in series with the first reactor containing a metallocene catalyst and the second reactor containing the same or different metallocene catalyst.

The process enables a person ordinarily skilled in the art to create an ethylene propylene diene polymer containing high diene content without reactor fouling due to gelling (or uncontrolled branching reactions).

The process further allows generating an ethylene propylene diene polymer with high degrees of long chain branching, a high molecular weight, a broad molecular weight distribution (MWD), a low tangent delta, and a high diene content while making use of known catalyst and two reactors in series.

Use of two reactors in series eliminates the need for a blending process, to combine two ethylene propylene diene polymers with different compositions and molecular weight distributions into a single polymer product enabling faster processing than other known processes.

No post reactor blending is needed with this new process.

The final high molecular weight tetrapolymer product contains ethylene propylene diene monomer (EPDM) polymer with high molecular weight having a very high state of cure with a lower diene content than previously developed EPDM polymers.

Stronger polymers provide improved mechanical properties, particularly for anti-vibration purposes.

The term "diene" as used herein can refer to an organic compound containing two double bonds. Usable dienes can be those that are capable of being polymerized by metallocene catalysts. In embodiments, the metallocene is a zirconocene or hafnocene.

The term "high molecular weight" as used herein can refer to an EPDM polymer with molecular weights as described below:

Mn>350,000 Dalton
Mw>500,000 Dalton wherein Mn is defined as number average molecular weight, Mw is defined as weight average molecular weight.

The term "molecular weight distribution" or (MWD) as used herein can refer to the weight average molecular weight of a polymer (Mw) divided by the number average molecular weight of a polymer (Mn). Mw and Mn are determined as follows:

$$M_n = \frac{\sum_i N_i M_i}{\sum_i N_i} \text{ and } M_w = \frac{\sum_i N_i M_i^2}{\sum_i N_i M_i}$$

The term "tangent delta" as used herein can refer to a measure of the relationship between viscosity and elasticity that is known to those ordinarily skilled in the art.

The descriptions below make use of norbornene derivatives as the diene for exemplary reasons. In particular, vinyl norbornene is usable herein. However, other dienes with similar chemical and reactive characteristics can be substituted by persons ordinarily skilled in the art.

In this process, a 5-Ethylidene-2-norbornene (ENB) can be used. In embodiments, it can comprise the structure:

Molecular Structure:
Formula: $C_9H_{12}$
Molecular Weight: 120.19
Synonyms for this molecule can include: ENB; Ethylidene Norbornene; 5-Ethylene-2-Norborene; Ethylidene-2-Norbornene; 5-Ethylidene Norbornene; 5-Ethylidene-2-Norbornen; 5-Ethylidenenorborn-2-ene; 5-ethylidene-5-norbornene; Ethylidene Norbornene (ENB)
Boiling Point: 146 degrees Celsius at 760 mmHg Flash Point: 38.3 degrees Celsius In this process, a 5-vinyl-2-norbornene (VNB) can be used which is known by the structure:

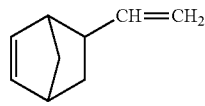

Molecular Structure:

Formula: $C_9H_{12}$

Molecular Weight: 120.21

Synonyms for this molecule can include: 2-Norbornene, 5-vinyl-(6CI,7CI,8CI); 2-Vinyl-5-norbornene; 2-Vinylbicyclo[2.2.1]hept-5-ene; 2-Vinylnorbornene; 5-Ethenylbicyclo[2.2.1]hept-2-ene; 5-Vinyl-2-norbornene; 5-Vinylbicyclo[2.2.1]hept-2-ene; 5-Vinylnorbornene; NSC 61529; V 0062; VBH; Vinylnorbornene Boiling Point: 141 degrees Celsius at 760 mmHg Flash Point: 28 degrees Celsius VNB is a non-conjugated diene with which it is known to be difficult to create copolymers due to its propensity to branch uncontrollably, create gels during polymerization, and foul a reactor.

The embodiments are a process for continuously making a high molecular weight tetrapolymer using two reactors connected in series for continuous polymerization.

In embodiments, a first reactor continuously can receive a saturated hydrocarbon stream.

The first reactor continuously receives a propylene monomer into the saturated hydrocarbon stream at a rate sufficient to achieve a propylene content of 20 percent to 35 percent based on total weight in a high molecular weight tetrapolymer product.

If needed, hydrogen gas can be introduced to the saturated hydrocarbon stream at a rate sufficient to control the molecular weight of the high molecular weight tetrapolymer product.

Next, a first non-conjugated diene can be introduced to the saturated hydrocarbon stream at a rate sufficient to achieve a desired first non-conjugated diene content in the high molecular weight tetrapolymer product.

In the first reactor, a second non-conjugated diene can be introduced to the saturated hydrocarbon stream at a rate sufficient to achieve a desired second non-conjugated diene content in the high molecular weight tetrapolymer product.

An ethylene monomer can be introduced to the saturated hydrocarbon stream at a rate sufficient to initiate a polymerization reaction and achieve a desired ethylene content of 50 percent to 80 percent based on total weight in the high molecular weight tetrapolymer product.

The combined saturated hydrocarbon stream, the propylene monomer, the optional hydrogen gas, the first non-conjugated diene, the second non-conjugated diene, and the ethylene monomer can be cooled to below 35 degrees Celsius to create a cooled mixture.

Concurrently a metallocene catalyst and a metallocene co-catalyst can be added to the cooled mixture in the first reactor.

The metallocene catalyst can be diphenylmethylene(cyclopentadienyl, 9-fluorenyl) zirconium dichloride, diphenylmethylene(cyclopentadienyl, 9-fluorenyl) hafnium dichloride, diphenylsilyl(cyclopentadienyl, 9-fluorenyl) zirconium dichloride, and dimethylsilyl(tetramethylcyclopentadienyl) (tert-butylamido titanium dichloride.

The metallocene catalyst can be introduced at a feed rate sufficient to sustain a continuous reaction.

The metallocene co-catalyst can be at least one of: N,N-dimethylanilinium tetrakis (pentaflourophenyl) borate, a methyl aluminoxane (MAO) or combination of the two, a trialkyl aluminum such as triisobutylaluminum, lithium tetrakis(pentafluorophenyl) borate, trityl tetrakis(pentafluorophenyl) borate, trispentafluorophenyl boron, and modified methylaluminoxane (MMAO).

In this process, the cooled mixture can be reacted with the metallocene catalyst and the metallocene co-catalyst for 15 minutes to 60 minutes at a temperature from 35 degrees Celsius to 65 degrees Celsius and at a pressure from 190 psig to 230 psig forming a high molecular weight tetrapolymer product.

The high molecular weight tetrapolymer product of the first reactor can have the following characteristics: polymer chain branching as characterized by a tangent delta ranging from 0.15 to 1.1 measured at 150 degrees Celsius, 0.84 rad/sec, and 13.95 percent strain amplitude on a rubber process analyzer RPA 2000™ made by Alpha Technologies.

Additionally, the characteristics can be a non-linear relationship between viscosity and shear as characterized by the tangent delta from 0.15 to 1.1 measured at 150 degrees Celsius, 0.84 rad/sec, and 13.95 percent strain amplitude on a rubber process analyzer RPA 2000™ made by Alpha Technologies.

In embodiments, the characteristics of the tetrapolymer formed in the first reactor can include a weight average molecular weight from 500,000 Daltons to 1,000,000 Daltons measured using a high temperature GPC (HTGPC) system equipped with triple detector array (TDA) manufactured by Malvern Instruments, Inc. at 125 degrees Celsius.

The characteristics of the tetrapolymer formed in the first reactor can have a dynamic complex viscosity from 250,000 Pa·sec to 1,200,000 Pa·sec measured at 150 degrees Celsius, 0.1 rad/sec and 13.95 percent strain amplitude on a rubber process analyzer RPA 2000™ made by Alpha Technologies.

In embodiments, the characteristics of the tetrapolymer formed in the first reactor can have an ethylene to propylene ratio ranging from 50:50 to 90:10 by weight forming an ethylene rich high molecular weight tetrapolymer product.

The characteristics of the tetrapolymer formed in the first reactor can have a molecular weight distribution ranging from 1.0 to 2.2 needed for producing a higher mechanical strength in the final high molecular weight tetrapolymer product.

In embodiments, the characteristics of the tetrapolymer formed in the first reactor can include a first non-conjugated diene content of 0.2 percent to 2 percent by weight content based upon the total weight.

The characteristics of the tetrapolymer formed in the first reactor can have a second non-conjugated diene content of 0.2 percent to 15 percent by weight content based upon the total weight, wherein the first non-conjugated diene is different from the second non-conjugated diene.

The second reactor can continuously receive the high molecular weight tetrapolymer product from the first reactor.

A saturated hydrocarbon stream can be continuously introduced in the second reactor at a rate to maintain a desired total residence time.

A propylene monomer can be introduced into the saturated hydrocarbon stream to the second reactor at a rate sufficient to achieve total propylene content of from 29 percent to 45 percent of total weight in the final high molecular weight tetrapolymer product produced by the second reactor.

A first non-conjugated diene can be introduced to the saturated hydrocarbon stream in the second reactor at a rate sufficient to achieve the desired 0.2 percent to 2 percent by weight of the final high molecular weight tetrapolymer product.

A second non-conjugated diene can be introduced to the saturated hydrocarbon stream at a rate sufficient to achieve the desired 0.2 percent to 15 percent by weight of the final tetrapolymer produced in the second reactor.

An ethylene monomer can be introduced to saturated hydrocarbon stream of the second reactor at a rate sufficient to initiate a polymerization reaction and achieve a desired ethylene content of 60 percent to 80 percent of total weight in the final tetrapolymer produced in the second reactor.

In embodiments, the combined saturated hydrocarbon stream, propylene monomer, first non-conjugated diene, second non-conjugated diene, and ethylene monomer in the second reactor can be cooled to a temperature below 35 degrees Celsius to create a cooled mixture.

A metallocene catalyst and co-catalyst can be concurrently and continuously introduced into the second reactor receiving the cooled mixture.

The metallocene catalyst can include a group IVB transition metal such as zirconium or hafnium. The metallocene catalyst can be introduced at a feed rate sufficient to sustain a continuous reaction.

The metallocene co-catalyst or co-catalysts can be the same as those introduced into the first reactor.

In embodiments, the combined ingredients of the cooled mixture, metallocene catalyst, and co-catalyst are reacted together in solution phase for 15 minutes to 60 minutes at a temperature from 35 degrees Celsius to 65 degrees Celsius at a pressure from 190 psig to 230 psig which is lower than the pressure used in the first reactor, forming a final high molecular weight tetrapolymer product.

The final high molecular weight tetrapolymer product can have the following characteristics: polymer chain branching as characterized by a tangent delta ranging from 0.15 to 1.1, a non-linear relationship between viscosity and shear as characterized by the tangent delta from 0.15 to 1.1, a weight average molecular weight of 500,000 to 1,500,000 Daltons, a dynamic complex viscosity of 600,000 Pa·sec to 1,400,000 Pa·sec, an ethylene to propylene ratio ranging from 50:50 to 90:10 by weight forming an ethylene rich high molecular weight tetrapolymer product with a molecular weight distribution ranging from 2.3 to 10.0 a first non-conjugated diene content of 0.2 percent to 2 percent by weight content based upon the total weight final tetrapolymer, and a second non-conjugated diene content of 0.2 percent to 15 percent by weight content based upon the total weight of the final high molecular weight tetrapolymer product.

In embodiments, the process contemplates adding 0.1 weight percent to 0.5 weight percent of an antioxidant to the final high molecular weight tetrapolymer product produced in the second reactor.

In embodiments, the saturated hydrocarbon stream can be a hexane or an isoparaffinic fluid.

In embodiments, the first non-conjugated diene and the second non-conjugated diene can have ethylidene norbornene, vinylnorbornene, dicyclopentadiene, and/or octadiene or combinations thereof.

In embodiments, the first non-conjugated diene can be a vinyl norbornene or 1,7-octadiene or dicyclopentadiene.

Example 1

The methodology described above was used to produce the following high molecular weight tetrapolymer.

Reactor #1

A saturated hydrocarbon stream can be introduced to a first reactor at 6,000 grams per hour.

A first propylene monomer can be introduced to the first saturated hydrocarbon stream at a rate of 420 grams per hour to achieve the first propylene content of 27 to 30 percent of total weight in a high molecular weight tetrapolymer product formed in the first reactor.

A hydrogen gas can be introduced to the first saturated hydrocarbon stream at 1.5 standard liters per hour to control the molecular weight of the high molecular weight tetrapolymer product formed in the first reactor.

A first non-conjugated diene of vinyl norbornene can be introduced to the first saturated hydrocarbon stream at a rate of 30 milligrams per hour to achieve a desired first non-conjugated diene content of 0.2 percent to 2 percent by weight in the high molecular weight tetrapolymer product formed in the first reactor.

A second non-conjugated diene of ethylidene norbornene can be introduced to the first saturated hydrocarbon stream at a rate of 10 grams per hour to achieve a desired second non-conjugated diene content of 0.2 percent to 15 percent by weight in the high molecular weight tetrapolymer product from the first reactor.

A first monomer of ethylene can be introduced to the first saturated hydrocarbon stream at a rate of 210 grams per hour to initiate the polymerization reaction and achieve desired ethylene content of 68 to 70 percent of total weight of the high molecular weight tetrapolymer formed in the first reactor.

The first saturated hydrocarbon stream, the first propylene monomer, the hydrogen gas, the first non-conjugated diene, the second non-conjugated diene, and the ethylene can be cooled to below 35 degrees Celsius as the components enter the reactor to create a cooled mixture.

In embodiments, a metallocene catalyst and co-catalysts can be simultaneously flowed into the first reactor.

The metallocene catalyst diphenylsilyl(cyclopentadienyl, 9-fluorenyl) zirconium dichloride was introduced at a feed rate sufficient to sustain a continuous reaction. In this example catalyst was introduced at a rate of 4.0 milligrams per hour neat.

The co-catalysts: methylaluminoxane (406 milligrams per hour), N,N-dimethylanilinium tetrakis(pentaflourophenyl) borate (56 milligrams per hour), and triisobutylaluminum (692 milligrams per hour) were all introduced at the specified rates to sustain the polymerization reaction.

The cooled mixture, the metallocene catalyst and co-catalysts, reacted for 25 minutes and at a temperature of 40 degrees Celsius and a pressure of 230 psig yields a high molecular weight tetrapolymer in the first reactor.

The high molecular weight tetrapolymer product has the following characteristics: polymer chain branching as characterized by a tangent delta of 0.698, a weight average molecular weight of 650,274 Daltons, a dynamic complex viscosity of 700,000 Pa·sec, an ethylene to propylene ratio 70:30 by weight, a molecular weight distribution of 2.2, a combined weight content of ethylene and propylene of 95.2 percent based upon the total weight of the resultant high molecular weight tetrapolymer, a first non-conjugated diene content of 0.227 percent by weight content based upon the total weight of the resultant high molecular weight tetrapolymer, and a second non-conjugated diene content of 4.73 percent by weight content based upon the total weight of the resultant high molecular weight tetrapolymer.

Reactor #2

In embodiments, a second reactor can continuously receive the high molecular weight tetrapolymer product from the first reactor. A second saturated hydrocarbon stream can be introduced into the second reactor at a rate to maintain the desired residence time; in this example the flow is 3,600 grams per hour.

A second propylene monomer can be introduced to the second saturated hydrocarbon stream at a rate of 180 grams per hour, which is sufficient to achieve total propylene content of 29 percent of total weight in the final high molecular weight tetrapolymer product.

A first non-conjugated diene (vinyl norbornene) can be introduced to the second saturated hydrocarbon stream to the second reactor at a rate of 2.0 grams per hour which is sufficient to achieve the desired 0.2 percent to 2 percent by weight first non-conjugated diene content in the final high molecular weight tetrapolymer product.

A second non-conjugated diene of ethylidene norbornene can be introduced to the second saturated hydrocarbon stream in the second reactor at a rate of 25 grams per hour, which is sufficient to achieve the desired second non-conjugated diene content of 0.2 percent to 15 percent by weight in the final high molecular weight tetrapolymer product.

A second ethylene monomer can be introduced to the second saturated hydrocarbon stream at a rate of 330 grams per hour that is sufficient to initiate the polymerization reaction and achieve desired ethylene content in the final high molecular weight tetrapolymer product.

The second saturated hydrocarbon stream, the propylene monomer, the first non-conjugated diene, the second non-conjugated diene, and the ethylene monomer can be cooled to below 35 degrees Celsius to create a second cooled mixture.

In embodiments, and all at once, additional metallocene catalyst diphenylsilyl(cyclopentadienyl, 9-fluorenyl) zirconium chloride, can be added at 3.5 milligams per hour neat, co-catalysts methylaluminoxane at 365 milligrams per hour neat, dimethylanilinium tetrakis(pentaflourophenyl) borate at 50.4 milligrams per hour neat and triisobutylaluminum at 623 milligrams per hour neat, all sufficient to sustain a continuous reaction.

The cooled mixture can react with additional metallocene catalyst, and the additional co-catalysts in solution phase for 20 minutes at a temperature of 36 degrees Celsius and a pressure of 190 psig, which is lower than the first reactor.

The final high molecular weight tetrapolymer product can have a polymer chain branching as characterized by a tangent delta of 0.70, a non-linear relationship between viscosity and shear as characterized by the tangent delta of 0.70, a weight average molecular weight of 773,387 Daltons, a dynamic complex viscosity of 760,000 Pa·sec, an ethylene to propylene ratio of 70.5:29.5 by weight, a molecular weight distribution of 2.4, a first non-conjugated diene, vinyl norbornene, content of 0.214 percent by weight content based upon the total weight of the final high molecular weight tetrapolymer product, and a second non-conjugated diene, ethylidene norbornene, content of 4.6 percent by weight content based upon the total weight of the final high molecular weight tetrapolymer product.

Example 2

The methodology described above was used to produce the following high molecular weight tetrapolymer.

Reactor #1

A saturated hydrocarbon of hexane can be introduced to a first reactor at 6,000 grams per hour.

A first propylene monomer can be introduced to the first saturated hydrocarbon stream at a rate of 420 grams per hour to achieve the first propylene content of 27 percent to 30 percent of total weight in a high molecular weight tetrapolymer product formed in the first reactor.

A hydrogen gas can be introduced to the first saturated hydrocarbon stream at 1.0 standard liters per hour to control the molecular weight of the high molecular weight tetrapolymer product formed in the first reactor.

A first non-conjugated diene of vinyl norbornene can be introduced to the first saturated hydrocarbon stream at a rate of 30 milligrams per hour to achieve a desired first non-conjugated diene content of 0.2 percent to 2 percent by weight in the high molecular weight tetrapolymer product formed in the first reactor.

A second non-conjugated diene of ethylidene norbornene can be introduced to the first saturated hydrocarbon stream at a rate of 10 grams per hour to achieve a desired second non-conjugated diene content of 0.2 percent to 15 percent by weight in the high molecular weight tetrapolymer product from the first reactor.

A first monomer of ethylene can be introduced to the first saturated hydrocarbon stream at a rate of 210 grams per hour to initiate the polymerization reaction and achieve desired ethylene content of 68 weight percent to 70 weight percent of total weight of the high molecular weight tetrapolymer formed in the first reactor.

The first saturated hydrocarbon stream, the first propylene monomer, the hydrogen gas, the first non-conjugated diene, the second non-conjugated diene, and the ethylene can be cooled to below 35 degrees Celsius as the components enter the reactor to create a cooled mixture.

In embodiments, a metallocene catalyst and co-catalysts can be simultaneously flowed into the first reactor.

The metallocene catalyst, a diphenylsilyl(cyclopentadienyl, 9-fluorenyl) zirconium dichloride can be introduced at a feed rate sufficient to sustain a continuous reaction. In this example the metallocene catalyst can be introduced at a rate of 4.0 milligrams per hour neat.

The co-catalysts: methylaluminoxane (406 milligrams per hour), N,N-dimethylanilinium tetrakis(pentaflourophenyl) borate (56 milligrams per hour), and triisobutylaluminum (692 milligrams per hour) can be introduced at the specified rates for each to sustain the polymerization reaction.

The cooled mixture at a temperature below 35 degrees Celsius, the metallocene catalyst and co-catalysts, are reacted for 25 minutes enabling a reaction temperature in the reactor of 40 degrees Celsius and a pressure of 230 psig yields a high molecular weight tetrapolymer in the first reactor.

The high molecular weight tetrapolymer product has the following characteristics: polymer chain branching as characterized by a tangent delta of 0.65, a weight average molecular weight of 715,300 Daltons, a dynamic complex viscosity of 850,000 Pa·sec, an ethylene to propylene ratio 70:30 by weight, a molecular weight distribution of 2.0, a combined weight content of ethylene and propylene of 95.2 percent based upon the total weight of the resultant high molecular weight tetrapolymer, a first non-conjugated diene content of 0.227 percent by weight content based upon the total weight of the resultant high molecular weight tetrapolymer, and a second non-conjugated diene content of 4.5 percent by weight content based upon the total weight of the resultant high molecular weight tetrapolymer.

Reactor #2

In embodiments, a second reactor can continuously receive the high molecular weight tetrapolymer product from the first reactor. A second saturated hydrocarbon stream can be introduced into the second reactor at a rate to maintain the desired residence time. In this example, the flow is 3,600 grams per hour.

A second propylene monomer can be introduced to the second saturated hydrocarbon stream at a rate of 180 grams per hour, which is sufficient to achieve total propylene content of 28 percent to 32 percent of total weight in the final high molecular weight tetrapolymer product.

A first non-conjugated diene (vinyl norbornene) can be introduced to the second saturated hydrocarbon stream to the second reactor at a rate of 2.0 grams per hour, which is sufficient to achieve the desired 0.2 percent to 2 percent first non-conjugated diene content in the final high molecular weight tetrapolymer product.

A second non-conjugated diene of ethylidene norbornene can be introduced to the second saturated hydrocarbon stream in the second reactor at a rate of 25 grams per hour, which is sufficient to achieve the desired second non-conjugated diene content of 0.2 percent to 15 percent in the final high molecular weight tetrapolymer product.

A second ethylene monomer can be introduced to the second saturated hydrocarbon stream at a rate of 360 grams per hour that is sufficient to initiate the polymerization reaction and achieve desired ethylene content in the final high molecular weight tetrapolymer product.

The second saturated hydrocarbon stream, the propylene monomer, the first non-conjugated diene, the second non-conjugated diene, and the ethylene monomer can be cooled to below 35 degrees Celsius to create a second cooled mixture.

Additional metallocene catalyst diphenylsilyl(cyclopentadienyl, 9-fluorenyl) zirconium chloride, can be added at 3.5 milligams per hour neat and co-catalysts dimethylanilinium tetrakis(pentaflourophenyl) borate at 50.4 milligrams per hour neat, and triisobutylaluminum at 623 milligrams per hour neat, all sufficient to sustain a continuous reaction.

The cooled mixture at a temperature below 35 degrees Celsius, the metallocene catalyst and co-catalysts, are reacted for 20 minutes enabling a reaction temperature in the reactor of 40 degrees Celsius and a pressure of 190 psig yields a high molecular weight tetrapolymer in the second reactor.

The final high molecular weight tetrapolymer product can have a polymer chain branching as characterized by a tangent delta of 0.645, a non-linear relationship between viscosity and shear as characterized by the tangent delta of 0.645, a weight average molecular weight of 805,900 Daltons, a dynamic complex viscosity of 950,000 Pa·sec, an ethylene to propylene ratio of 71:29 by weight, a molecular weight distribution of 2.4, a first non-conjugated diene, vinyl norbornene content of 0.21 percent by weight content based upon the total weight of the final high molecular weight tetrapolymer product, and a second non-conjugated diene, ethylidene norbornene content of 4.6 percent by weight content based upon the total weight of the final high molecular weight tetrapolymer product.

Example 3

Reactor #1

A saturated hydrocarbon stream can be introduced to a first reactor at 6,000 grams per hour.

A first propylene monomer can be introduced to the first saturated hydrocarbon stream at a rate of 420 grams per hour to achieve the first propylene content of 27 to 30 percent of total weight in a high molecular weight tetrapolymer product formed in the first reactor.

A hydrogen gas can be introduced to the first saturated hydrocarbon stream at 1.5 standard liters per hour to control the molecular weight of the high molecular weight tetrapolymer product formed in the first reactor.

A first non-conjugated diene of vinyl norbornene can be introduced to the first saturated hydrocarbon stream at a rate of 30 milligrams per hour to achieve a desired first non-conjugated diene content of 0.2 percent to 2 percent by weight in the high molecular weight tetrapolymer product formed in the first reactor.

A second non-conjugated diene of ethylidene norbornene can be introduced to the first saturated hydrocarbon stream at a rate of 10 grams per hour to achieve a desired second non-conjugated diene content of 0.2 percent to 15 percent by weight in the high molecular weight tetrapolymer product from the first reactor.

A first monomer of ethylene can be introduced to the first saturated hydrocarbon stream at a rate of 210 grams per hour to initiate the polymerization reaction and achieve desired ethylene content of 68 to 70 percent of total weight of the high molecular weight tetrapolymer formed in the first reactor.

The first saturated hydrocarbon stream, the first propylene monomer, the hydrogen gas, the first non-conjugated diene, the second non-conjugated diene, and the ethylene can be cooled to below 35 degrees Celsius as the components enter the reactor to create a cooled mixture.

In embodiments, a metallocene catalyst and co-catalysts can be simultaneously flowed into the first reactor.

The metallocene catalyst diphenylsilyl(cyclopentadienyl, 9-fluorenyl) zirconium dichloride can be introduced at a feed rate sufficient to sustain a continuous reaction. In this example, the catalyst can be introduced at a rate of 4.0 milligrams per hour neat.

The co-catalysts: methylaluminoxane (406 milligrams per hour), N,N-dimethylanilinium tetrakis(pentaflourophenyl) borate (56 milligrams per hour), and triisobutylaluminum (692 milligrams per hour) can be introduced at the specified rates to sustain the polymerization reaction.

The cooled mixture, the metallocene catalyst and co-catalysts, reacted for 25 minutes at a temperature of 40 degrees Celsius and a pressure of 230 psig yields a high molecular weight tetrapolymer in the first reactor.

The high molecular weight tetrapolymer product can have the following characteristics: polymer chain branching as characterized by a tangent delta of 1.098, a weight average molecular weight of 831,555 Daltons, a dynamic complex viscosity of 550,000 Pa·sec, an ethylene to propylene ratio 71:29 by weight, a molecular weight distribution of 1.9, a combined weight content of ethylene and propylene of 97.6 percent based upon the total weight of the resultant high molecular weight tetrapolymer, a first non-conjugated diene content of 0.2 percent by weight content based upon the total weight of the resultant high molecular weight tetrapolymer, and a second non-conjugated diene content of 2.2 percent by weight content based upon the total weight of the resultant high molecular weight tetrapolymer.

Reactor #2

In embodiments, a second reactor can continuously receive the high molecular weight tetrapolymer product from the first reactor. A second saturated hydrocarbon stream can be introduced into the second reactor at a rate to maintain the desired residence time; in this example the flow is 3,600 grams per hour.

A second propylene monomer can be introduced to the second saturated hydrocarbon stream at a rate of 200 grams per hour, which is sufficient to achieve total propylene content of 29 percent of total weight in the final high molecular weight tetrapolymer product.

A first non-conjugated diene (vinyl norbornene) can be introduced to the second saturated hydrocarbon stream to the second reactor at a rate of 2.0 grams per hour, which is sufficient to achieve the desired 0.2 percent to 2 percent by weight first non-conjugated diene content in the final high molecular weight tetrapolymer product.

A second non-conjugated diene of ethylidene norbornene can be introduced to the second saturated hydrocarbon stream in the second reactor at a rate of 25 grams per hour, which is sufficient to achieve the desired second non-conjugated diene content of 0.2 percent to 15 percent by weight in the final high molecular weight tetrapolymer product.

A second ethylene monomer can be introduced to the second saturated hydrocarbon stream at a rate of 330 grams per hour that is sufficient to initiate the polymerization reaction and achieve desired ethylene content in the final high molecular weight tetrapolymer product.

The second saturated hydrocarbon stream, the propylene monomer, the first non-conjugated diene, the second non-conjugated diene, and the ethylene monomer can be cooled to below 35 degrees Celsius to create a second cooled mixture.

In embodiments, and all at once, additional metallocene catalyst diphenylmethylene(cyclopentadienyl, 9-fluorenyl) zirconium chloride, can be added at 3.3 milligams per hour neat, co-catalysts, dimethylanilinium tetrakis(pentaflourophenyl) borate at 7.1 milligrams per hour neat and triisobutylaluminum at 650 milligrams per hour neat, all sufficient to sustain a continuous reaction.

The cooled mixture can react with additional metallocene catalyst, and the additional co-catalysts in solution phase for 20 minutes at a temperature of 36 degrees Celsius and a pressure of 190 psig, which is lower than the first reactor.

The final high molecular weight tetrapolymer product can have a polymer chain branching as characterized by a tangent delta of 0.7095, a non-linear relationship between viscosity and shear as characterized by the tangent delta of 0.7095, a weight average molecular weight of 752,403 Daltons, a dynamic complex viscosity of 760,000 Pa·sec, an ethylene to propylene ratio of 70.7:29.3 by weight, a molecular weight distribution of 2.93, a first non-conjugated diene of vinyl norbornene content of 0.214 percent by weight content based upon the total weight of the final high molecular weight tetrapolymer product, and a second non-conjugated diene, ethylidene norbornene content of 4.8 percent by weight content based upon the total weight of the final high molecular weight tetrapolymer product.

FIG. 1 shows examples of tetrapolymers that can be prepared by the processes described above. Examples 4 and 5 can be prepared according to the methodologies described in Example 1. Examples 6 through 10 can be prepared according to methodologies described in Example 3.

While the embodiments have been described with emphasis on the embodiments, it should be understood that within the scope of the appended claims, the embodiments might be practiced other than as specifically described herein.

What is claimed is:

1. A process for continuously making a high molecular weight tetrapolymer, the process comprising:
   a. in a first reactor continuously:
      (i) introducing a saturated hydrocarbon stream;
      (ii) introducing a propylene monomer to the saturated hydrocarbon stream at a rate to achieve a propylene content of 20 weight percent to 35 weight percent based on a total weight of the high molecular weight tetrapolymer product;
      (iii) optionally, introducing hydrogen gas to the saturated hydrocarbon stream at a rate to control a molecular weight of the high molecular weight tetrapolymer product;
      (iv) introducing a first non-conjugated diene to the saturated hydrocarbon stream at a rate to achieve a first non-conjugated diene content in the high molecular weight tetrapolymer product;
      (v) introducing a second non-conjugated diene to the saturated hydrocarbon stream at a rate to achieve a second non-conjugated diene content in the high molecular weight tetrapolymer product;
      (vi) introducing an ethylene monomer to the saturated hydrocarbon stream at a rate to initiate a polymerization reaction and achieve a ethylene content of 50 percent to 80 percent based on the total weight in the high molecular weight tetrapolymer product;
      (vii) cooling the combined saturated hydrocarbon stream, the propylene monomer, the optional hydrogen gas, the first non-conjugated diene, the second non-conjugated diene, and the ethylene monomer to below 35 degrees Celsius to create a cooled mixture;
      (viii) introducing to the cooled mixture, a metallocene catalyst, and at least two co-catalysts to the cooled mixture in the first reactor, wherein:
      (ix) the metallocene catalyst comprises: a diphenylsilyl (cyclopentadienyl, 9-fluorenyl) zirconium dichloride or a diphenylmethylene (cyclopentadienyl, 9-fluorenyl) zirconium dichloride, wherein the metallocene catalyst is introduced at a feed rate to sustain a continuous reaction; and
      (x) the metallocene co-catalyst comprises a trialkyl aluminum and at least one of: a N,N dimethyl anilinium tetrakis (pentaflourophenyl) borate and methyl aluminoxane (MAO), wherein:
         1. the co-catalyst is introduced at a feed rate to sustain the continuous reaction; and
         2. the co-catalyst comprises a triisobutyl aluminum and at least one of: a N,Ndimethyl anilinium tetrakis (pentaflourophenyl) borate and methyl aluminoxane (MAO);
      (xi) reacting the cooled mixture with the metallocene catalyst and the co-catalyst for 15 minutes to 60 minutes at a temperature from 35 degrees Celsius to 65 degrees Celsius and at a pressure from 190 psig to 230 psig; and forming the high molecular weight tetrapolymer product with the following characteristics:
         1. polymer chain branching having a tangent delta ranging from 0.15 to 1.1;
         2. a non-linear relationship between viscosity and shear having the tangent delta from 0.15 to 1.1;

3. a weight average molecular weight from 500,000 Daltons to 1,000,000 Daltons;
4. a dynamic complex viscosity from 250,000 Pa·sec to 1,200,000 Pa·sec;
5. an ethylene to propylene ratio ranging from 50:50 to 90:10 by weight forming an ethylene rich high molecular weight tetrapolymer product;
6. a molecular weight distribution ranging from 1.0 to 2.2 for producing the high molecular weight tetrapolymer product;
7. a first non-conjugated diene content of 0.2 percent to 2 percent by weight content based upon the total weight of the high molecular weight tetrapolymer product; and
8. a second non-conjugated diene content of 0.2 percent to 15 percent by weight content based upon the total weight of the high molecular weight tetrapolymer product, wherein the first non-conjugated diene is different from the second non-conjugated diene;

b. in a second reactor continuously receiving the high molecular weight tetrapolymer product from the first reactor and continuously forming the high molecular weight tetrapolymer product, the process comprising the steps of:
(i) introducing a saturated hydrocarbon stream to the second reactor;
(ii) introducing a propylene monomer to the second reactor at a rate to achieve total propylene content of 29 weight percent to 45 weight percent of the total weight in the high molecular weight tetrapolymer product;
(iii) introducing a first non-conjugated diene to the second reactor at a rate to achieve a first non-conjugated diene content in the high molecular weight tetrapolymer product;
(iv) introducing to the second reactor a second non-conjugated diene at a rate to achieve a second non-conjugated diene content in the high molecular weight tetrapolymer product;
(v) introducing an ethylene monomer to the second reactor at a rate to initiate a polymerization reaction and achieve a ethylene content of from 60 percent to 80 percent of the total weight in the high molecular weight tetrapolymer product;
(vi) cooling in the second reactor, the combined saturated hydrocarbon stream, the propylene monomer, the first non-conjugated diene, the second non-conjugated diene, and the ethylene monomer to a temperature from 35 degrees Celsius to 70 degrees Celsius to create a cooled mixture;
1. introducing into the second reactor a second metallocene catalyst and second metallocene co-catalyst, the second metallocene catalyst comprising at least one of: a diphenylsilyl (cyclopentadienyl, 9-fluorenyl) zirconium dichloride or a diphenylmethylene (cyclopentadienyl, 9-fluorenyl) zirconium dichloride, wherein the second metallocene catalyst is introduced at a feed rate to sustain a continuous reaction; and
2. the second metallocene co-catalyst comprises a trialkyl aluminum and at least one of: a N,N dimethyl anilinium tetrakis (pentaflourophenyl) borate and methyl aluminoxane (MAO);
(vii) reacting together the cooled mixture, the second metallocene catalyst, and the second metallocene co-catalyst, in solution for 15 minutes to 60 minutes at a temperature from 30 degrees Celsius to 65 degrees Celsius at a pressure from 190 psig to 230 psig, the pressure maintained lower than pressure in the first reactor forming a high molecular weight tetrapolymer product comprising:
1. polymer chain branching having a tangent delta ranging from 0.15 to 1.1;
2. a non-linear relationship between viscosity and shear having the tangent delta from 0.15 to 1.1;
3. a weight average molecular weight of 500,000 Daltons to 1,500,000 Daltons;
4. a dynamic complex viscosity from 600,000 Pa·sec to 1,400,000 Pa·sec;
5. an ethylene to propylene ratio ranging from 50:50 to 90:10 by weight forming an ethylene rich high molecular weight tetrapolymer product;
6. a molecular weight distribution ranging from 2.3 to 10.0 for producing the high molecular weight tetrapolymer product;
7. a first non-conjugated diene content of 0.2 percent to 2 percent by weight content based upon the total weight of the high molecular weight tetrapolymer product; and
8. a second non-conjugated diene content of 0.2 percent to 15 percent by weight content based upon the total weight of the high molecular weight tetrapolymer product.

2. The process of claim 1, further comprising: adding at least one of: 0.1 weight percent to 0.5 weight percent of an antioxidant to the first reactor and 0.1 weight percent to 0.5 weight percent of an antioxidant added to the second reactor.

3. The process of claim 1, wherein the saturated hydrocarbon stream is a hexane or an isoparaffinic fluid.

4. The process of claim 1, wherein the first non-conjugated diene and the second non-conjugated diene are at least one of: a norbornene derivative, an octadiene, a cyclopentadiene, and combinations thereof.

5. The process of claim 4, wherein the first non-conjugated diene is at least one of: a vinyl norbornene, a 1,7 octadiene, and a dicylopentadiene.

6. The process of claim 1, comprising mixing the first metallocene catalyst and the first metallocene co-catalyst before introduction to the first reactor.

7. The process of claim 6, comprising mixing the second metallocene catalyst and the second metallocene co-catalyst before introduction to the second reactor.

8. The process of claim 1, comprising adding an extender oil to at least one reactor.

9. The process of claim 1, wherein the high molecular weight tetrapolymer product is used for manufacturing an anti-vibration article.

10. The process of claim 9, wherein the anti-vibration article comprises at least one of: a vehicle muffler hanger, an exhaust pipe hanger, an engine mount, a thermoplastic vulcanizate (TPV), a belt, a gasket, and a hose.

* * * * *